United States Patent
Whiteman et al.

(10) Patent No.: US 11,099,088 B2
(45) Date of Patent: Aug. 24, 2021

(54) STRAIN TORQUE MEASUREMENT SYSTEM

(71) Applicant: DEERE & COMPANY, Moline, IL (US)

(72) Inventors: Steven R. Whiteman, Dubuque, IA (US); Jonathan D. Forster, Wann, OK (US); Dean H. Lehrke, Altamont, KS (US); Stacy K. Worley, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 165 days.

(21) Appl. No.: 16/228,875

(22) Filed: Dec. 21, 2018

(65) Prior Publication Data
US 2020/0200626 A1 Jun. 25, 2020

(51) Int. Cl.
*G01L 3/10* (2006.01)
(52) U.S. Cl.
CPC .................... *G01L 3/108* (2013.01)
(58) Field of Classification Search
CPC ...................................... G01L 3/108
USPC ..................... 73/862.331–862.338
See application file for complete search history.

(56) References Cited

U.S. PATENT DOCUMENTS

| | | | |
|---|---|---|---|
| 3,305,818 A * | 2/1967 | Brueggeman | G01L 9/0051 338/4 |
| 3,903,738 A | 9/1975 | Malchow | |
| 4,002,139 A * | 1/1977 | Payne | G01B 5/30 116/212 |
| 4,474,060 A * | 10/1984 | Crossman | B60T 8/52 73/129 |
| 4,530,245 A | 7/1985 | Jacobson | |
| 4,608,861 A * | 9/1986 | Wachtler | E21B 47/007 73/152.48 |
| 4,625,554 A * | 12/1986 | Lanzoni | G21C 3/326 73/581 |
| 4,821,563 A * | 4/1989 | Maron | E21B 47/007 73/152.48 |
| 7,240,570 B2 | 7/2007 | McDearmon | |
| 7,706,935 B2 | 4/2010 | Dube et al. | |
| 9,052,011 B2 | 6/2015 | Morselli et al. | |

(Continued)

FOREIGN PATENT DOCUMENTS

DE 102010027010 A1 1/2012
DE 102012200232 A1 7/2013
(Continued)

OTHER PUBLICATIONS

Eric Hicks, Torque Sensors on Electric Bikes, retrieved from Internet (https://www.electricbike.com/Torque-Sensors#Comments), dated Oct. 18, 2012, 11 pages.

(Continued)

*Primary Examiner* — Octavia Hollington

(57) ABSTRACT

A torque sensor assembly is used with a driveline component. The torque sensor assembly includes a holder, a sleeve, and at least one strain sensor. The holder includes a side wall that has a holder outer surface and a holder inner surface. The holder outer surface is corresponding to and attached to an aperture of the driveline component. The sleeve is corresponding to and attached to the holder inner surface. The strain sensor is attached to the sleeve and used to sense a strain in the driveline component.

19 Claims, 10 Drawing Sheets

(56) References Cited

U.S. PATENT DOCUMENTS

| | | | |
|---|---|---|---|
| 10,309,847 B2 * | 6/2019 | Cheng | G01L 3/04 |
| 2006/0117863 A1 | 6/2006 | Kim | |
| 2009/0021363 A1 | 1/2009 | Heise et al. | |

FOREIGN PATENT DOCUMENTS

| | | |
|---|---|---|
| DE | 102015201577 A1 | 8/2016 |
| DE | 102015201607 A1 | 8/2016 |
| DE | 202018107337 U1 | 1/2019 |
| DE | 102017120796 A1 | 3/2019 |
| DE | 102019216027 A1 | 6/2020 |
| EP | 2615022 A1 | 7/2013 |
| JP | 2012189495 * | 10/2012 |
| WO | 2003082527 A1 | 10/2003 |
| WO | 2013104981 A1 | 7/2013 |
| WO | 2016120093 A2 | 8/2016 |
| WO | 2016120095 A1 | 8/2016 |

OTHER PUBLICATIONS

Torque Sensor and Geared Drive, retrieved from Internet (https://ibikes.wordpress.com/2015/06/07/torque-sensor-geared-drive/), dated Jul. 6, 2015, 7 pages.

German Search Report issued in counterpart application No. 10219216027.1 dated Jul. 13, 2020 (05 pages).

* cited by examiner

STRAIN TORQUE MEASUREMENT SYSTEM

RELATED APPLICATIONS

N/A.

FIELD OF THE DISCLOSURE

The present disclosure relates generally to a sensor applied to a driveline component to measure the torque thereon.

BACKGROUND OF THE DISCLOSURE

For mechanical powertrain systems, improvements in the measurement of system torques are desirable since variation in torque affects the efficiency and longevity of individual powertrain components. Since powertrain torque flow is often split into different paths between and within drivetrain components, it is useful to measure the individual torques that comprise the total input or output torque amplitudes. So, it is desired to develop an inexpensive and accurate reactive torque sensing device that can be easily installed at various locations within a mechanical powertrain system to improve monitoring and/or control of powertrain components.

SUMMARY OF THE DISCLOSURE

According to an aspect of the present disclosure, a torque sensor assembly is used with a driveline component. The torque sensor assembly includes a holder, a sleeve, and at least one strain sensor. The holder includes a side wall that has a holder outer surface and a holder inner surface. The holder outer surface is corresponding to and attached to an aperture of the driveline component. The sleeve is corresponding to and attached to the holder inner surface. The strain sensor is attached to the sleeve and used to sense a strain in the driveline component.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
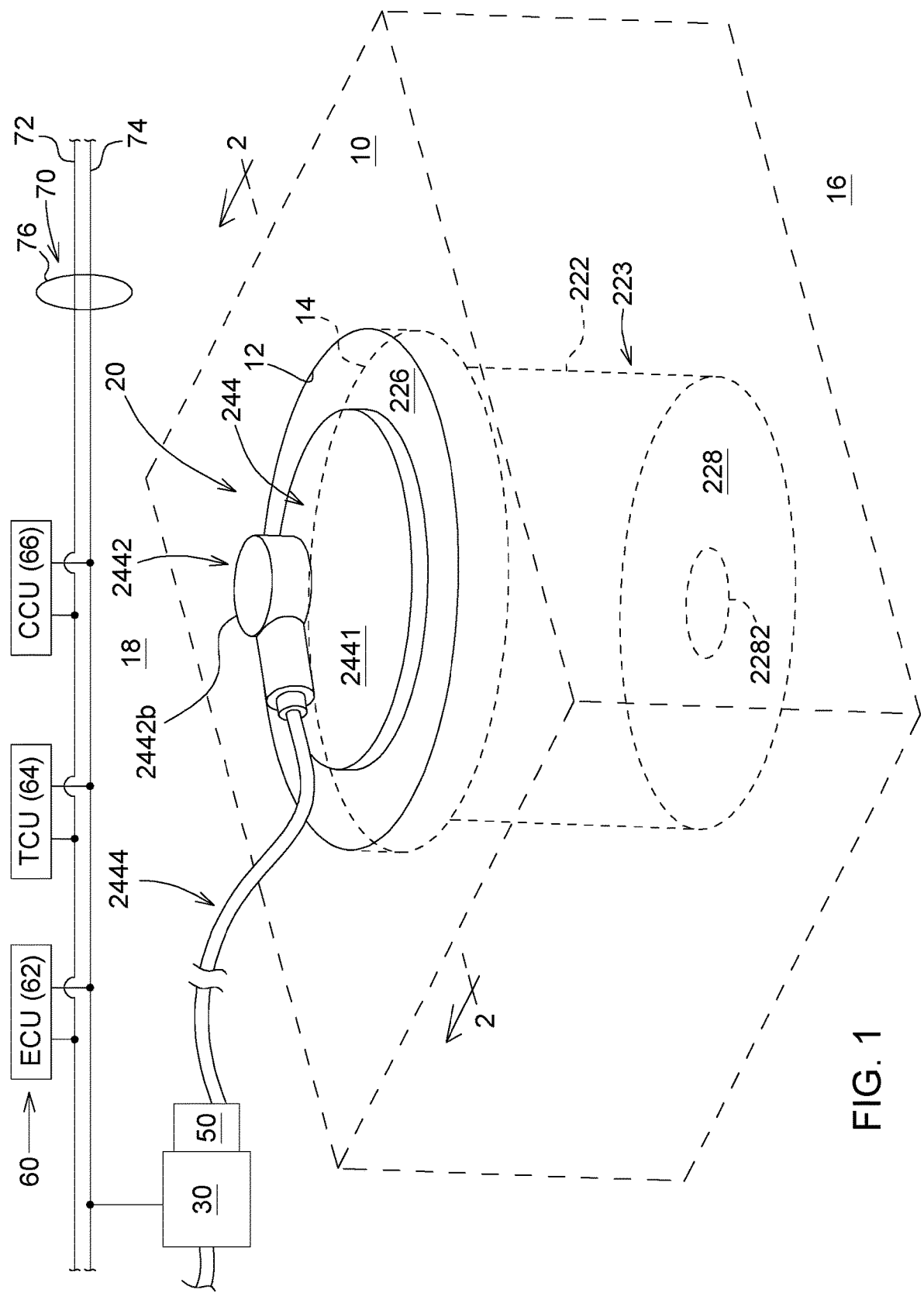
FIG. 1 is a perspective view of a driveline component cooperating with a torque sensor assembly.
Figure 2:
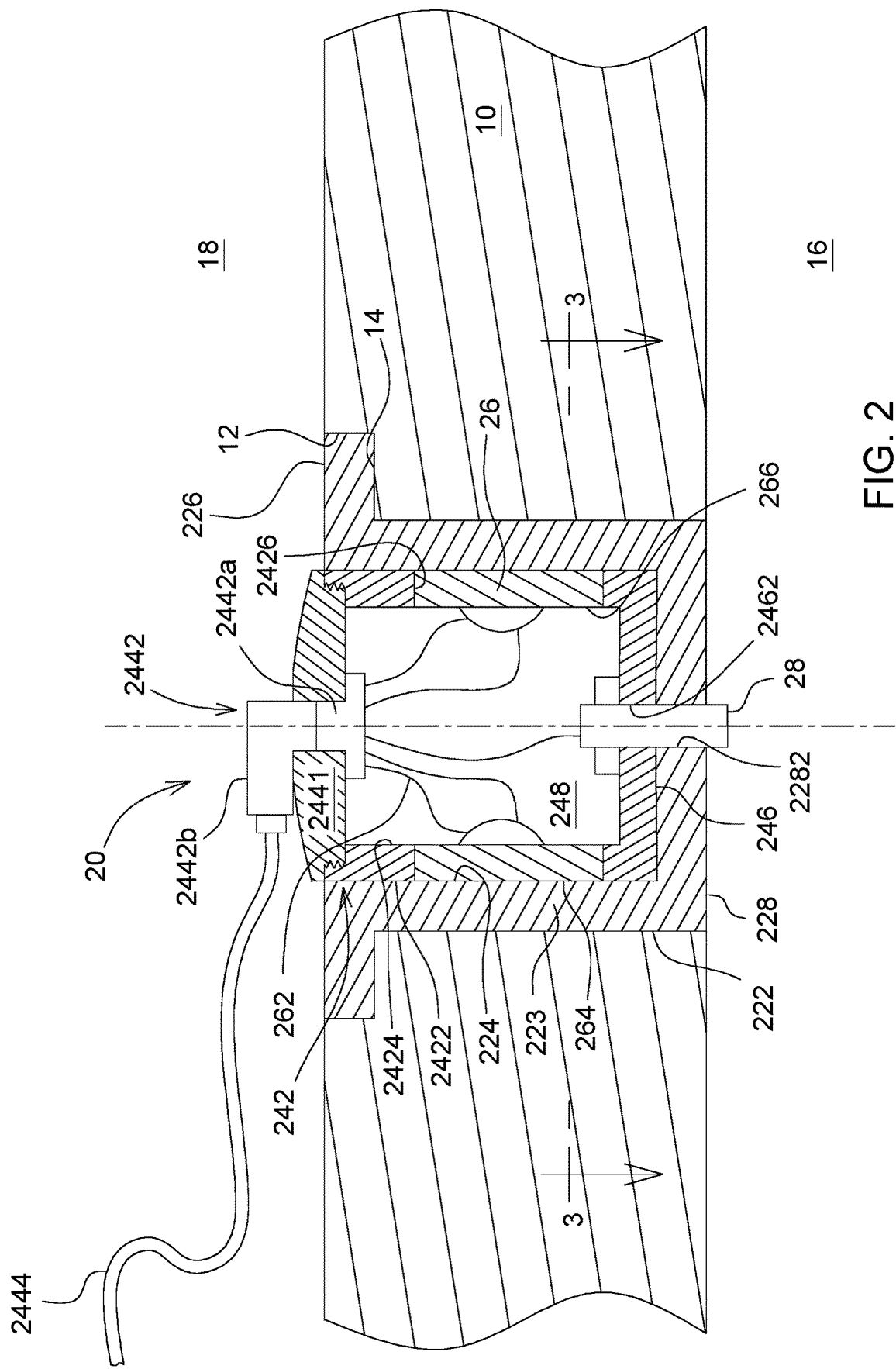
FIG. 2 is a cross-sectional view as viewed along view line 2-2 of FIG. 1.

Referring to FIGS. 1-2, 3A and 4, a driveline component 10 receives a torque sensor assembly 20 to measure the strain surrounding the torque sensor assembly 20 that will be utilized to calculate the torque. The driveline component 10 (including a machine housing) may include but is not limited to a transmission, gearbox, differential, engine, axle modules (not shown). The driveline component 10 comprises at least one aperture 12 that has a recess 14. As shown in FIG. 2, the driveline component 10 defines an interior region 16 which may further comprise other elements as a shaft, gears, bearings and lubricant oil. An exterior region 18 is outside driveline component 10. Strains are created by (1) the torque resulted from rotation of elements of the driveline component, such as a bearing that is engaged with a rotating shaft (not shown), and/or (2) the engagement between multiple gears which causes a dynamic reactive torque across the driveline component 10, and/or (3) temperature of the driveline component 10 that causes thermal expansion; and/or (4) vibration, movement, acceleration of driveline component 10. The non-torque related strains from (2) to (4) shall be filtered or isolated in the torque calculation, or may be reduced or eliminated due to the configuration and/or orientation and/or placement of the torque sensor assembly 20 which will be described later. Due to the aperture 12 of the driveline component 10, a torque sensitive strain area is provided in immediate proximity to or adjacent to the aperture 12. The torque sensitive strain area may be in compressive and/or tensive strain. The relationship between torque and strain in this application will be introduced later. The aperture 12 of the driveline component 10 can be one of a blind hole or through hole. In this embodiment, an analyzer 30 (or can also be called as strain signal controller, signal analyzer, and torque signal transmitter) is positioned outside the torque sensor assembly 20 and electrically connected to the torque sensor assembly 20 and at least one controller 60. The controller(s) 60 may include but not limit to engine control unit (ECU) 62, transmission control unit (TCU) 64, and chassis control unit (CCU) 66. The analyzer 30 communicates with ECU 62, TCU 64, CCU 66 through Controller Area Network (CAN) 70. CAN frames are normally placed on a CAN Bus 76, which comprises a first signal carrying line 72 and a second signal carrying line 74. The controller(s) 60 is connected to the first and second signal carrying lines 72, 74. The analyzer 30 will be described in more detail later.

Figure 3A:
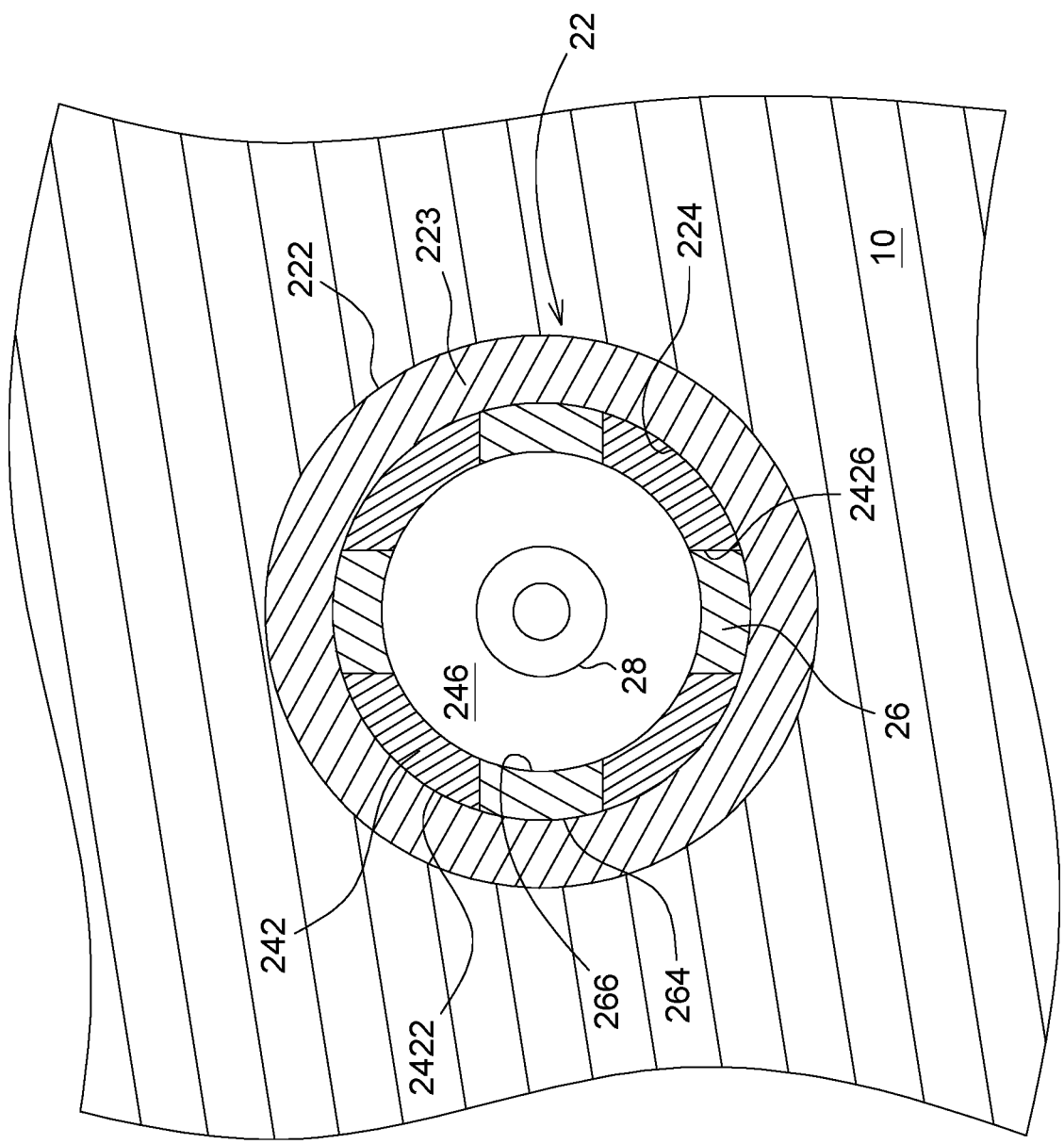
FIG. 3A is a cross-sectional view as viewed along view line 3-3 of FIG. 2.
Figure 4:
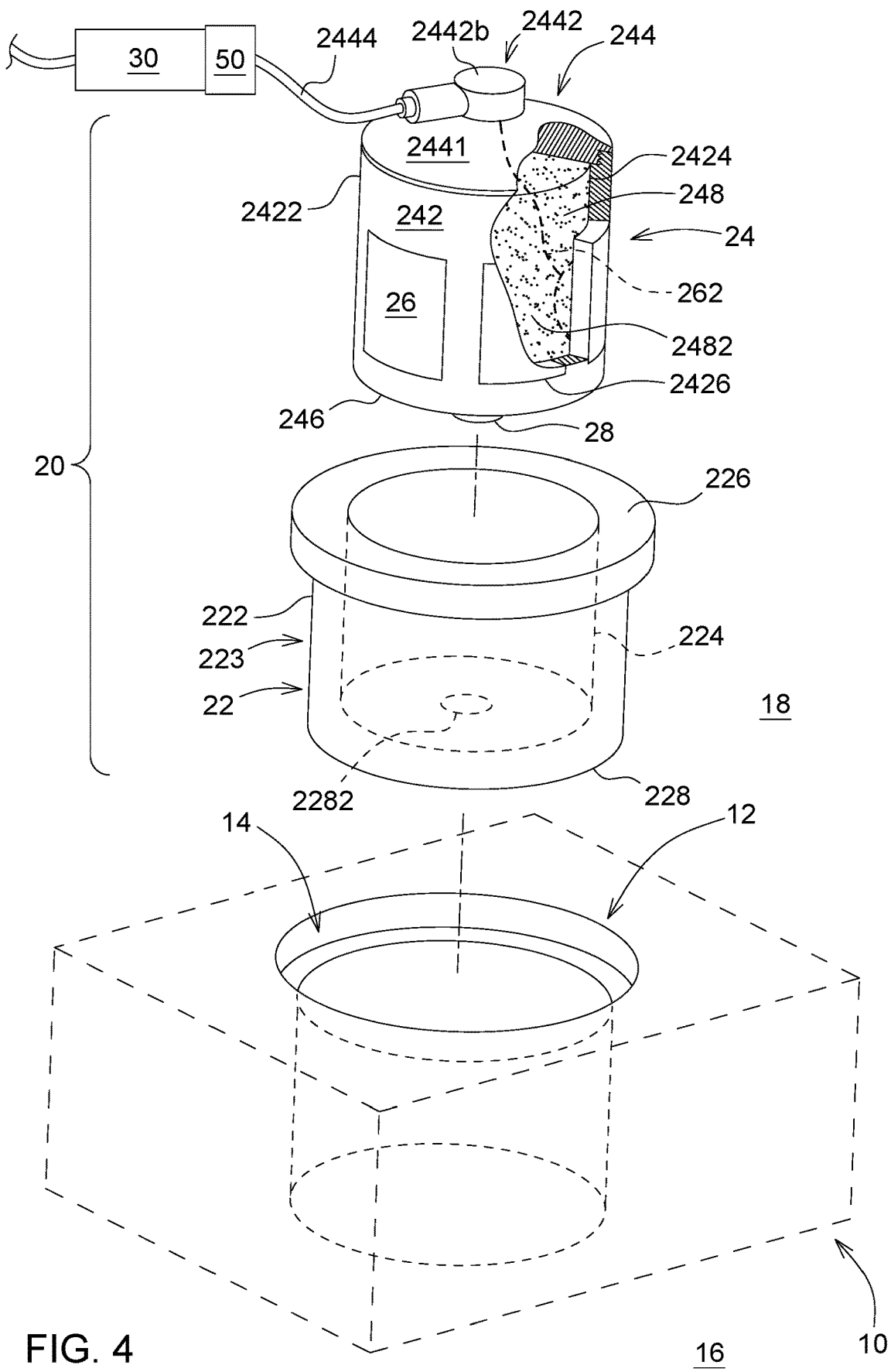
FIG. 4 is an exploded view of FIG. 1.

The torque sensor assembly 20 includes a holder 22, a sleeve 242, and at least one strain sensor 26. In this embodiment, the number of the strain sensors 26 is four. The material of the holder 22 for example can be metal. As shown in FIGS. 2, 3A, and 4, the holder 22 comprises a side wall 223, which is sleeve-shaped in this embodiment. The side wall 223 has a holder outer surface 222, and a holder inner surface 224 parallel to the holder outer surface 222. The holder outer surface 222 corresponds and attaches to the aperture 12 of the driveline component 10. Optionally, the side wall 223 and the aperture 12 have an interference fit, that means, the diameter of the aperture 12 is slightly smaller than the diameter of the side wall 223 to ensure the side wall 223 and the aperture 12 are tightly coupled with each other. Alternative to the interference fit, the aperture 12 and the side wall 223 may be threaded to engage one another (not shown), or bonded together with an adhesive.

The holder 22 may also comprise a flange 226 configured to be positioned in the aperture 12 of the driveline component 10. The aperture 12 of the driveline component 10, in proximity to the holder 22, may further comprise a recess 14 in which the flange 226 is positioned. In the assembling process, the top of the flange 226 is pressed toward the recess 14 and then the bottom of the flange 226 may be engaged with the bottom of the recess 14 to ensure the holder 12, with other elements of the torque sensor assembly 20, are completely assembled into the aperture 12.

Optionally, the holder 22 may comprise a holder end wall 228. The side wall 223 of the holder 22 interconnects the flange 226 and the holder end wall 228 to form a cup-shaped holder as shown in FIG. 4. The cup-shaped holder 22 may be applied to the aperture 12 when it is a through-hole as illustrated in an embodiment in FIGS. 1-4 or a blind hole as shown in another embodiment in FIGS. 5, 7 and 8. Alternatively, the holder 22 may not comprise the holder end wall 228 (not shown) when the holder 22 is positioned in the aperture 12 which is a blind hole.

Referring again to FIGS. 1, 2, 3A, and 4, the sleeve 242, in this embodiment, is included in a capsule 24. The sleeve 242 has a sleeve outer surface 2422, and a sleeve inner surface 2424 parallel to the sleeve outer surface 2422. The sleeve outer surface 2422 of the sleeve 242 corresponds and attaches to the holder inner surface 224. The sleeve 242 is configured for the at least one strain sensor 26 to attach to. In this embodiment, the sleeve 242 includes four windows 2426. The side of each of the strain sensors 26 is attached to one of the windows 2426 of the sleeve 242. The strain sensors 26 are secured on the sleeve 242 via the interference-fit relationship between the side of the strain sensors 26 and the windows 2426 or there is an adhesive gel combines the two. In this configuration, the assembling process of the torque sensor assembly 20 is simplified because the strain sensors 26 are attached on the sleeve 242 first and then the sleeve 242 carries the strain sensors 26 to engage with the holder 22.

Figure 3B:
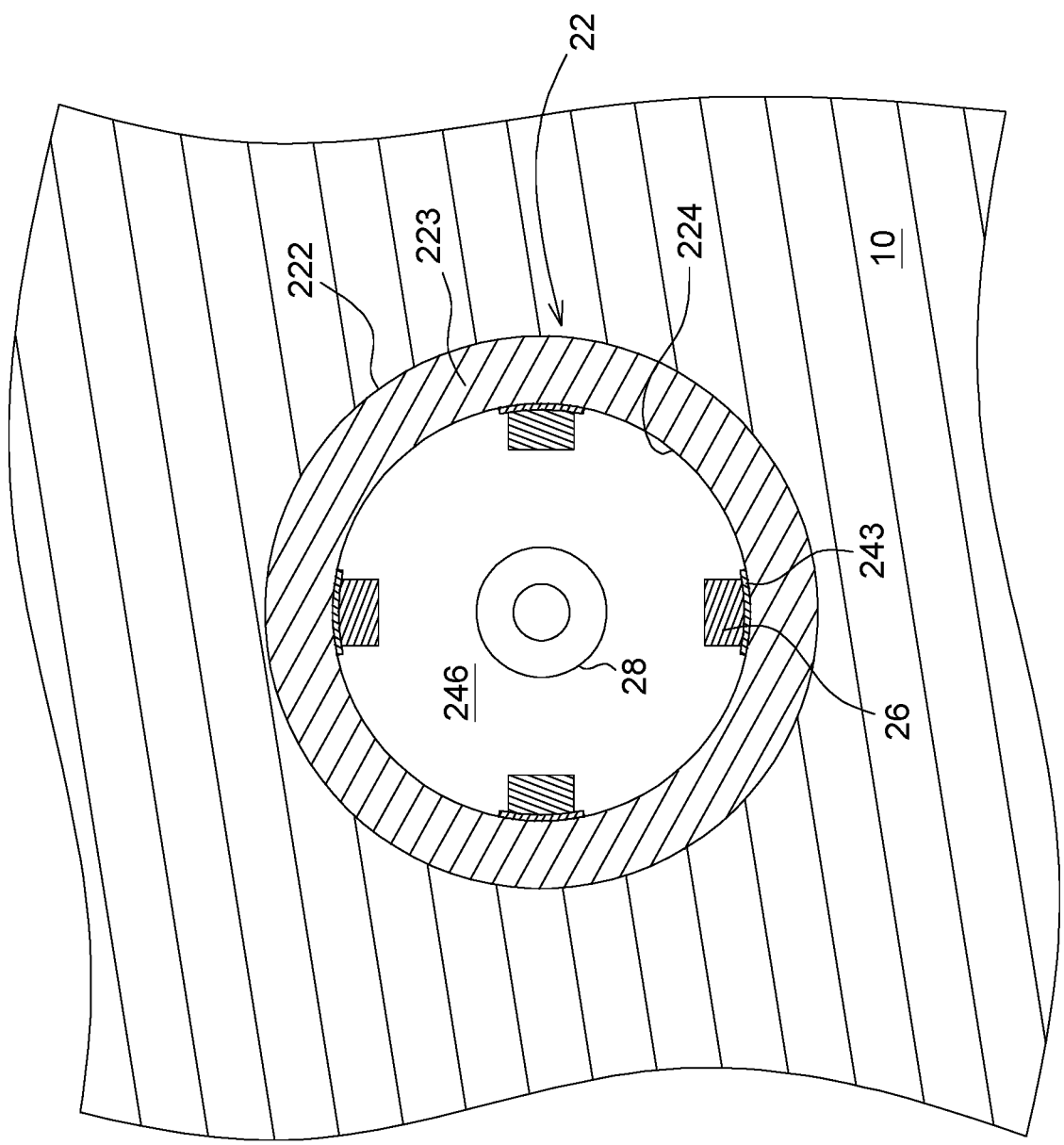
FIG. 3B is another embodiment of the sleeve.

Alternatively, in another embodiment of the sleeve 242, as shown in FIG. 3B, the sleeve 242 can be an intermediate material to secure the relative positions between the strain sensors 26 and the holder 22. The sleeve 242 may be one or more curvature segments, such as an adhesive, respectively couple the strain sensors 26 to the holder inner surface 244.

Figure 6:
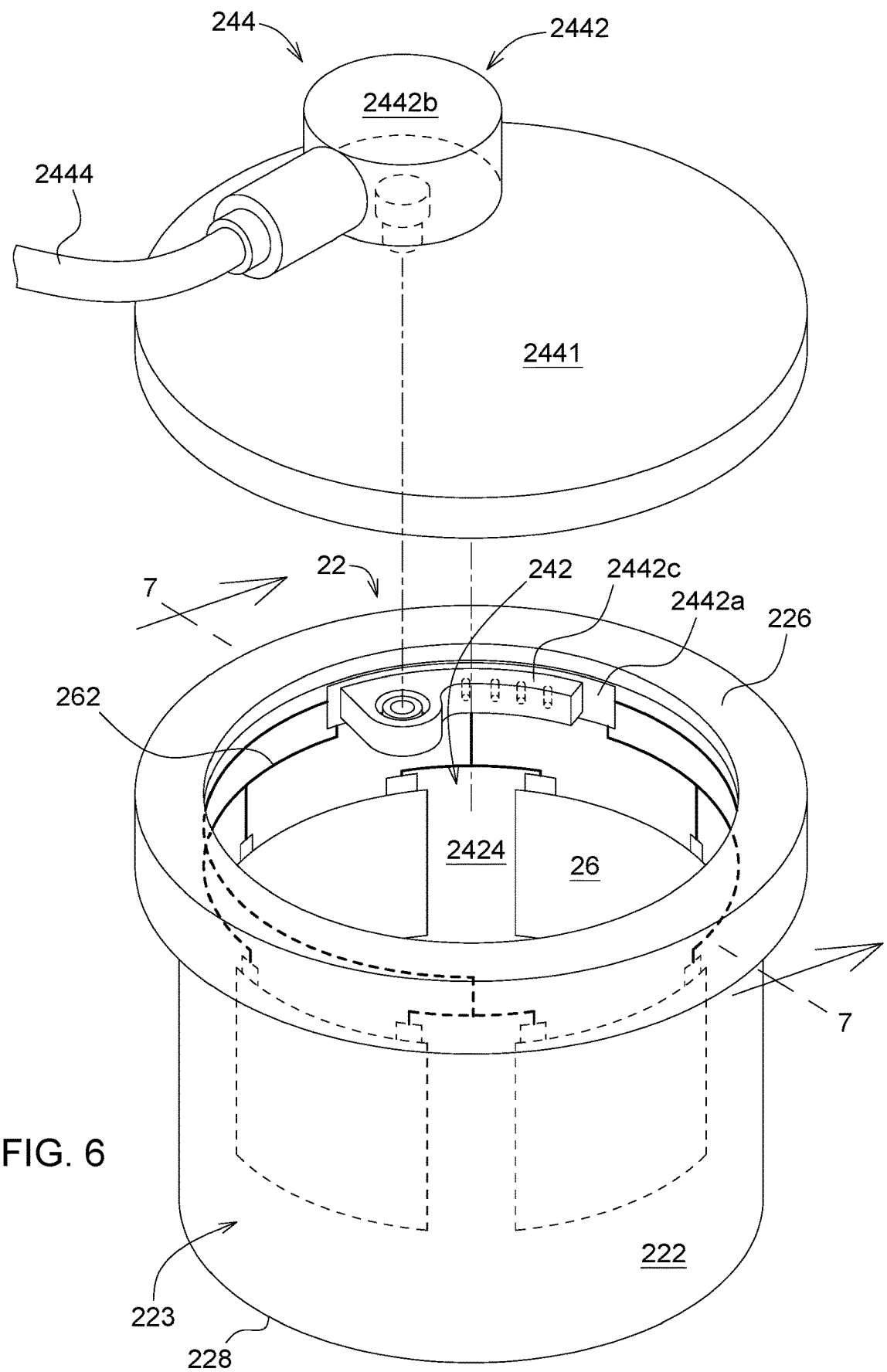
FIG. 6 is partial exploded view of another embodiment of a torque sensor assembly.
Figure 7:
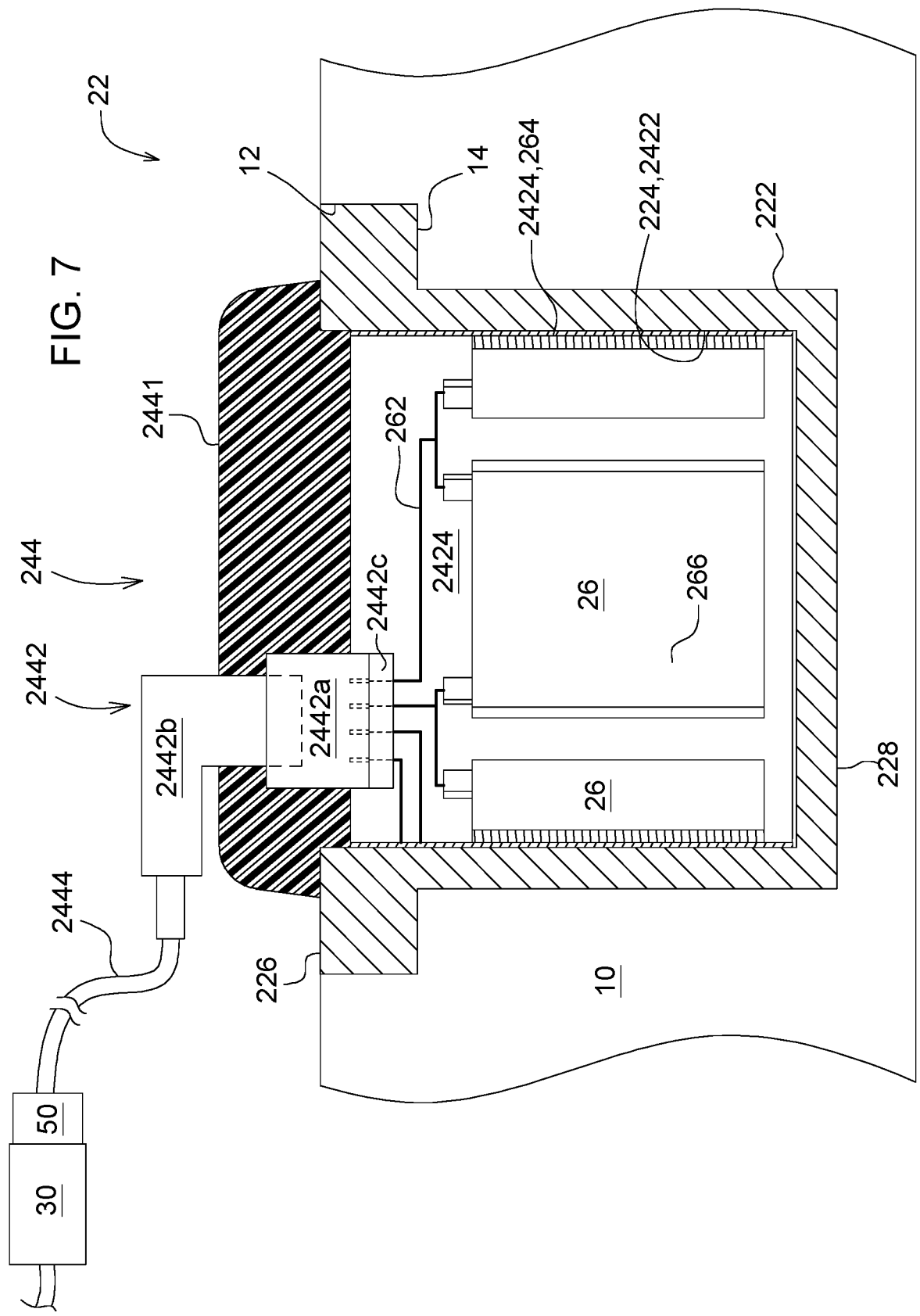
FIG. 7 is a cross-sectional view as viewed along view line 6-6 of FIG. 6.
Figure 8:
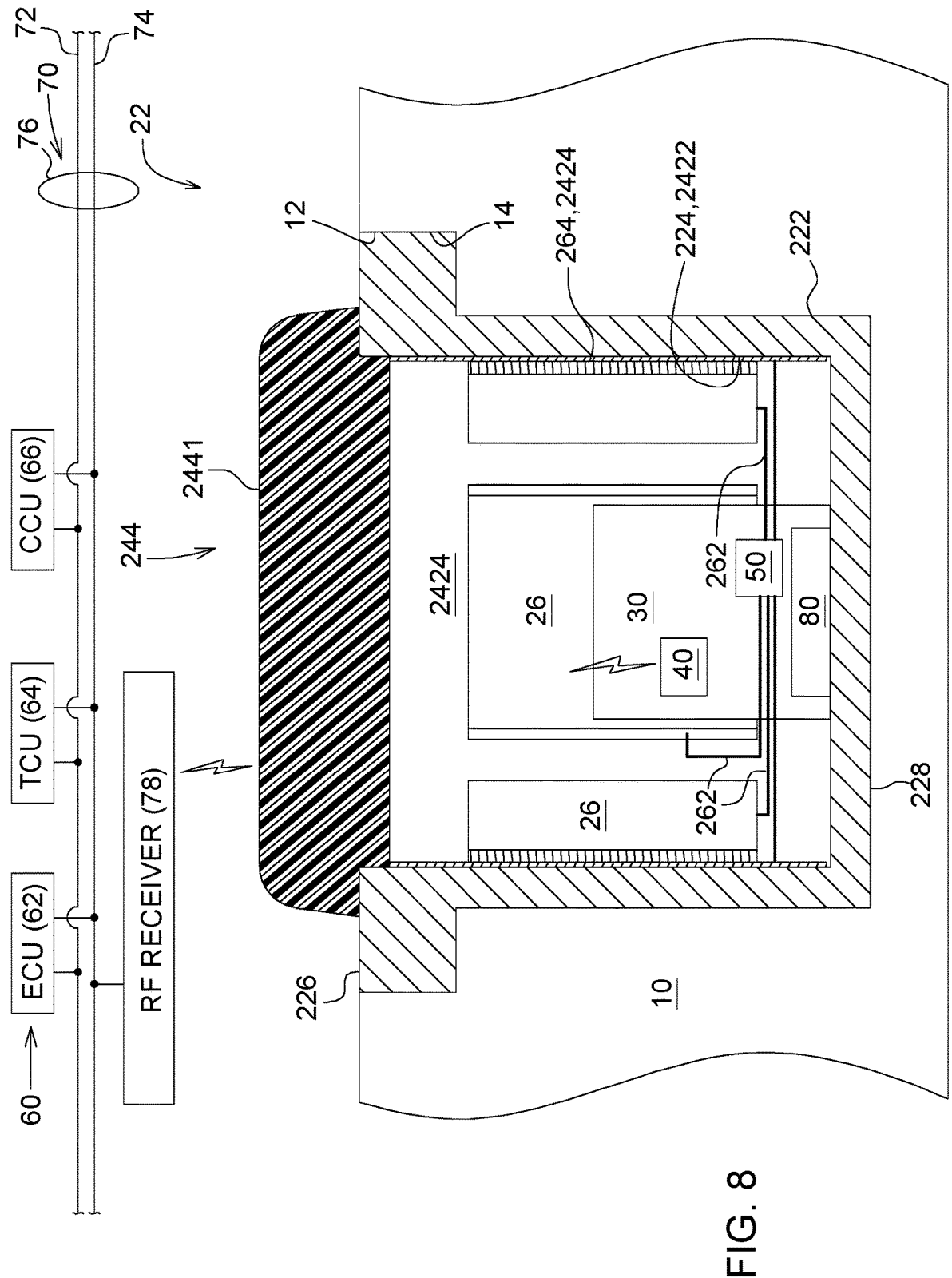
FIG. 8 is cross-sectional view of another embodiment of a torque sensor assembly.

In the embodiment as shown in FIGS. 1-2, 3A, and 4, the sleeve 242 may be coupled to other elements of the capsule 24 to form an interior region 248 where at least one strain sensor 26 is partially exposed. The capsule 24 may comprise a cap 244 to cover the top opening of the holder 22. The cap 244 includes a lid 2441 and a connector 2442 extending through the lid 2441 and configured to be coupled to a analyzer 30. The lid 2441 is coupled to at least one of the upper part of the sleeve 242, and/or upper part of the side wall 223 of the holder 22. In this embodiment, the circumference of lid 2441 and the upper part of the sleeve 242 are threaded and therefore the lid 2441 and the sleeve 242 can be engaged. Alternatively, the lid 2441 of the cap 244 may be coupled to the upper part of the side wall 223 which has an opening via interference fit (the interference fit/snap fit features are shown in FIGS. 6-8). The capsule 24 may also comprise capsule end wall 246. The interior region 248 is enclosed/encapsulated by the sleeve 242, the cap 244, and the capsule end wall 246, as shown in FIG. 2. In another embodiment (not shown), if there is no capsule end wall 246 but there is the holder end wall 228, the interior region 248 is enclosed by the sleeve 242, the cap 244, and the holder end wall 228. In another embodiment (not shown), if there is no capsule end wall 246 nor holder end wall 228, but the torque sensor assembly 20 is positioned in the aperture 12 that is a blind hole, the interior region 248 is enclosed by the sleeve 242, the cap 244, and the bottom of the blind hole.

The strain sensors 26 are electrically coupled to a connector 2442 of the cap 244 via conductors 262. The conductors 262 are configured to communicate power to the strain sensors 26 or transmit signals indicative of the strains measured by the strain sensor 26, or both. The details and types of the strain sensors 26 will be introduced later with FIGS. 9 and 10. The signals indicative of the strains are received by the analyzer 30 as shown in FIG. 1. It is noted that, within a range of strain measured at least partially within the aperture 12, the strain is substantially correlative to (e.g. substantially linear to) the torque applied on axle/shaft of the driveline component 10. The strain measured by the torque sensor assembly 20 is calculated by the analyzer 30 to obtain the torque value. It is noted that before the analyzer 30 processes the data, a signal conditioning module 50 that may be integrated into the analyzer 30 or remain as stand-alone component positioned inside or outside the interior region 248 and coupled to the analyzer 30, conditions the data from the strain sensors 26 for the analyzer 30 to process. In this embodiment, the signal conditioning module 50 is positioned outside the interior region 248. The details of the analyzer 30 and the signal conditioning module 50 are described below.

Figure 10:
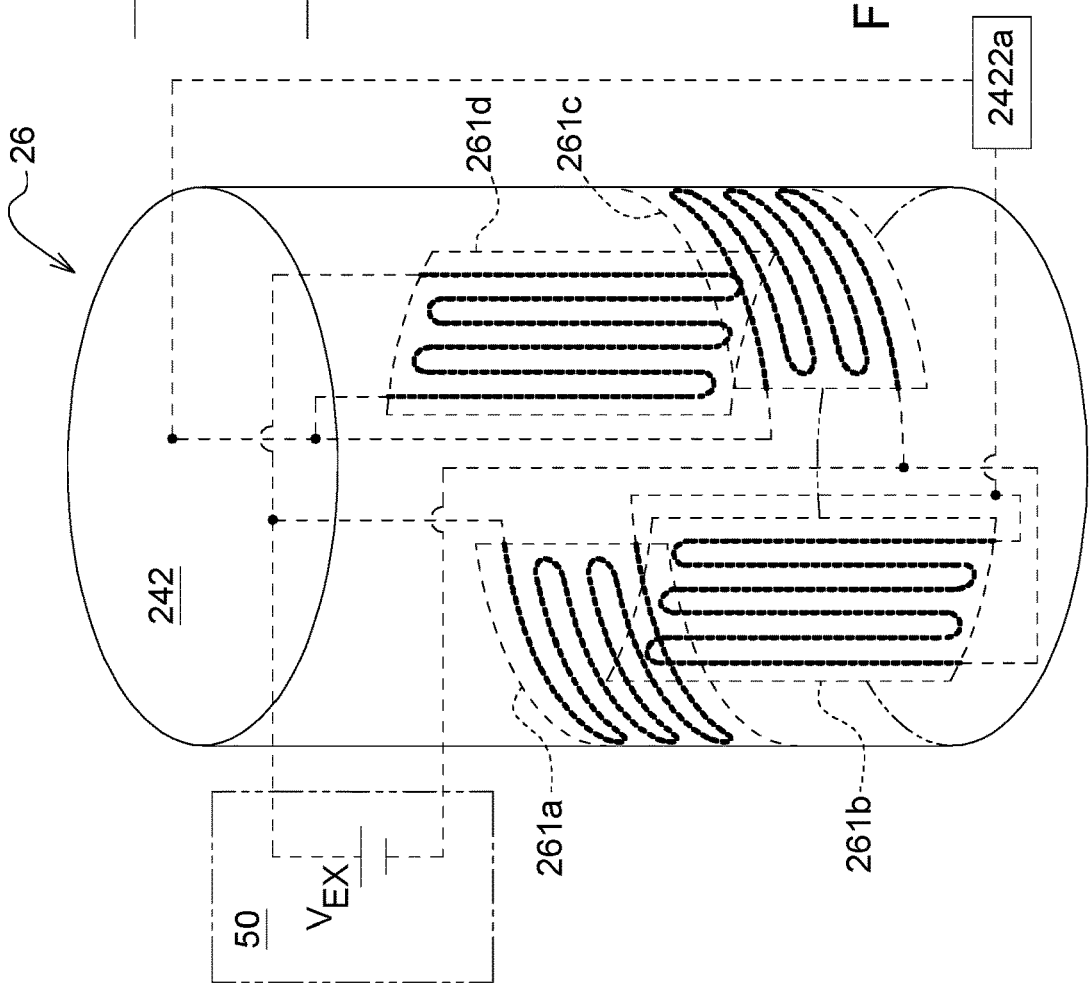
FIG. 10 is a perspective view of the strain sensors of FIG. 1.

Referring to FIGS. 1 and 10, the signal conditioning module 50 may provide an excitation current and/or excitation voltage ($V_{EX}$), or a bias signal to power the strain sensor(s) 26. The strain sensors 26 in this embodiment are resistance strain sensors. The signal conditioning module 50 then reads the signal (voltage or current or resistance) from the strain sensor(s) 26 and sends the signal to the analyzer 30. The analyzer 30 then performs calculations on the signal and then sends that modified or analyzed signal (e.g. a signal indicative of torque) via wire connection to other devices that display the analyzed signal (torque) or to the controller 60 that can make decisions with the torque signal. If the controller 60 is the engine control unit 62, it receives the modified or analyzed signal (e.g. a signal indicative of torque) from the analyzer 30 and determines the engine operative performance. If the controller 60 is the transmission control unit 64, it receives the modified or analyzed signal from the analyzer 30 and determines whether to adjust an output shaft rotational speed via switching the engagement of gears. Likewise, the torque sensor assembly 20 may be applied to other controller to change the rotational speed or gear engagement of the other types of driveline components 10. Alternatively, the analyzer 30 can be integrated in one of the controllers 60 (not shown).

Referring to FIGS. 1-2, 3A, and 4, it is noted that the interior region 248 may accommodate a potting material 2482. The potting material 2482 could be chemical compound such as epoxy. For clarity, in this embodiment, FIGS. 2, 3A omits the potting material 2482 but it is shown in FIG. 4. The connector 2442 comprises a first piece 2442a and a second piece 2442b coupled to the first piece 2442a such that the lid 2441 is positioned or clamped therebetween. When the potting material 2482 is injected into the interior region 248, the potting material 248 is liquid and fills the interior region 248 without interfering with the conductors 262. One end of each of the conductors 262 is coupled to one of sensor inner surfaces 266 of the strain sensors 26 and the other end of each of the conductors 262 is coupled to the first piece 2442a of the connector 2442. Before or after the potting material 2482 is solidified, the first piece 2442a and the second piece 2442b of the connector 2442 are combined to clamp the lid 2441 and the lid 2441 is coupled to the sleeve 242.

Referring again to FIGS. 1-2, 3A, and 4, the torque sensor assembly 20 may include a temperature sensor 28. In this embodiment, the temperature sensor 28 is at least partially positioned in the interior region 248 of the capsule 24 and partially positioned in the interior region 16 of the driveline component 10. Because the temperature of the driveline component 10 may influence the strain and therefore affect the torque calculation, a signal indicative of the temperature is transmitted to the analyzer 30 via the connector 2442 and output line 2444.

Figure 5:
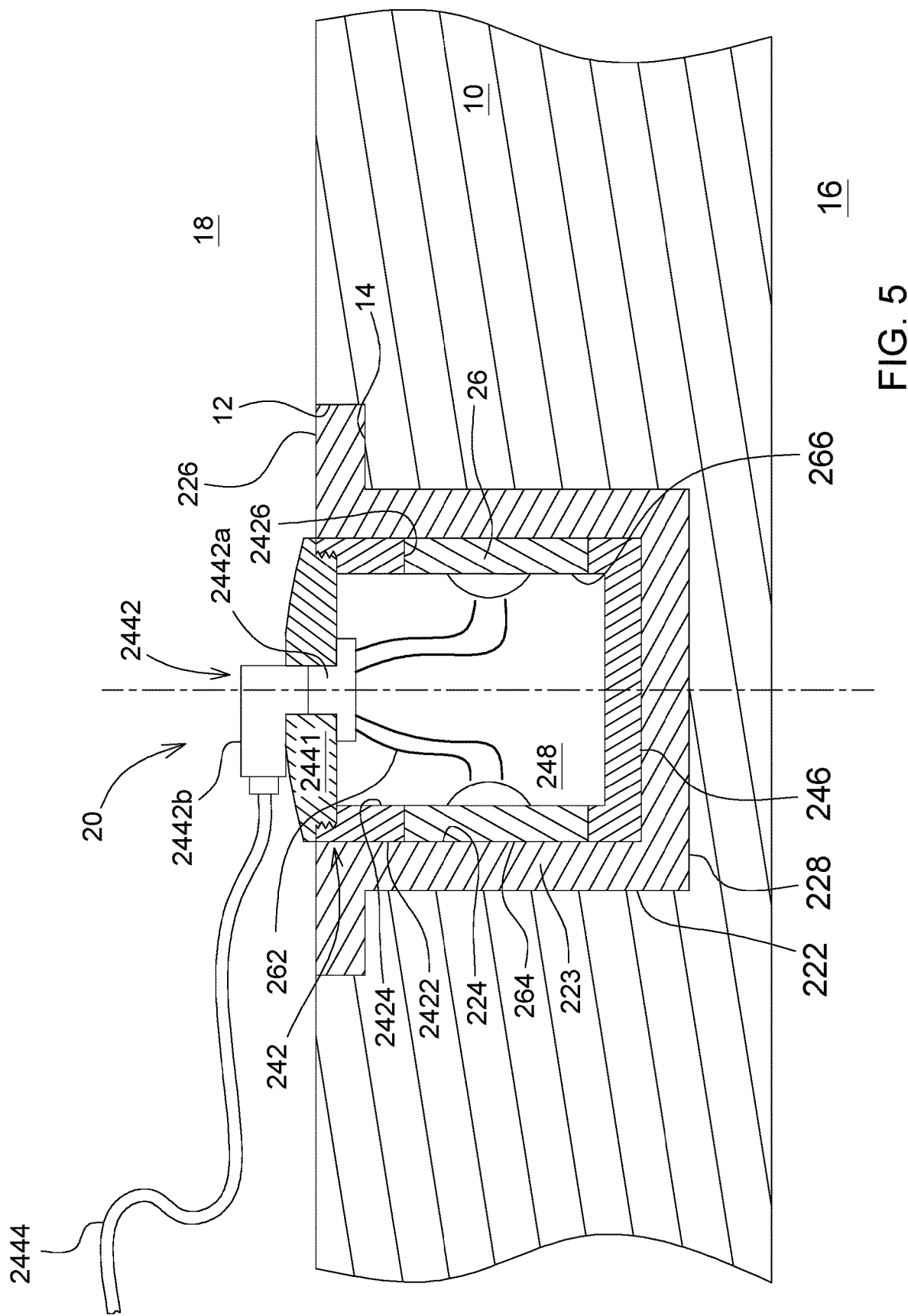
FIG. 5 is a cross-sectional view as showing another embodiment of the sleeve, the holder, and the driveline component.

The temperature sensor 28 in FIG. 3A may be optional. In another embodiment, as shown in FIG. 5, there is no temperature sensor 28. The end wall 228 is engaged with the bottom of the aperture 12 which is a blind hole in this embodiment.

In another embodiment, as shown in FIGS. 6 and 7, the sleeve 242 is a printed circuit board (PCB) electrically coupled to at least one strain sensor 26. Optionally, in the embodiment, a flexible printed circuit board (FPCB) is chosen. Due to the flexibility of the printed circuit, the sleeve 242 in this embodiment is configured to be bended such that the sleeve outer surface 2422 and holder inner surface 224 can be engaged. Here, the strain sensors 26 are electrically coupled to the printed circuit board via conductors 262, such as traces, partially integrated within the printed circuit board. The sensor outer surface 264 is attached to the sleeve inner surface 2424. The potting material 2482 is omitted in FIGS. 6 and 7. The connector 2442 comprises the first piece 2442a and second piece 2442b. The conductors 262 (e.g. traces) are collected by the first piece 2442a of the connector 2442. The first piece 2442a printed on the FPCB is partially coupled to a third piece 2442c. The second piece 2442b is partially inserted into the lid 2441 of the cap 244 and further engaged with the third piece 2442c. The lid 2441 in this embodiment is coupled to the upper part of the side wall 223. The bottom of the lid 2241 has a protrusion that is snapped into the opening of the holder 22. Depending on the design of the conductors 262 (traces) of the sleeve 242, the first piece 2442a of the connector 2442 may be positioned adjacent to the ends of most of the conductors 262 to collect the strain data. Therefore, the connector 2442 may not be positioned through the center of the lid 2441.

Referring to FIG. 8, contrary to the embodiments of FIGS. 1-7 that demonstrate the connector 2442 and the output line 2444 transmitting the data/signal to the analyzer 30, this embodiment utilizes wireless approach. In this embodiment, the analyzer 30 is positioned inside the torque sensor assembly 20 as part of the torque sensor assembly 20 and wirelessly connected to at least one controller 60, including ECU 62, TCU 64, CCU 66. The strain sensors 26 transmit signals indicative of strain they measured to the signal conditioning module 50. The signal conditioning module 50, as described in previous embodiment, conditions the signal and transmits the signal to the analyzer 30. The analyzer 30 modifies the signal indicative of strain into an appropriate format and/or analyzes the signal indicative of strain to calculate the torque as described previously. The modified or analyzed signal (e.g. a signal indicative of torque) is transmitted wirelessly via a transmitter 40. The transmitter 40 is a telematic transmitter that transmits a radio signal to an RF receiver 78 (radio frequency receiver). The RF receiver 78 in this embodiment is a WiFi type of receiver. The RF receiver 78 can store or retransmit the signal indicative of the torque to at least one controller 60 such as ECU 62, TCU 64, CCU 66 via CAN bus 76. Alternative to the embodiment as shown in FIG. 8, if the analyzer 30 is coupled to the CAN bus 76, the transmitter 40 transmits a signal indicative of the strain to the RF receiver 78 and the analyzer 30 receives the signal indicative of the strain from the RF receiver 78. The analyzer 30 modifies and analyzes the signal indicative of the strain and calculate the torque value. The signal indicative of torque will be sent to other controller 60 on the CAN bus 76.

Referring to FIG. 8, the torque sensor assembly 20 may include at least one battery module (not shown) that provides power for at least one of the signal conditioning module 50 to condition the signal indicative of the strain, for the analyzer 30 to modify and/or to analyze the conditioned signal and/or to calculate the torque, and for the transmitter 40 to transmit the signal indicative of torque to the controller 60. The at least one battery module may be a stand-alone component electrically coupled to at least one of the signal conditioning module 50, the analyzer 30, and the transmitter 40. Alternatively, the at least one battery module may be included by the signal conditioning module 50, the analyzer 30, and the transmitter 40. The battery module may be disposable or rechargeable. Referring to FIG. 8, the torque sensor assembly 20 may also include a power supply 80 attached to the holder end wall 228. The power supply 80 is a self-powered power supply/source (e.g. piezoelectric power source) that generates energy when the holder end wall 228 moves, such as vibration and extension. The at least one battery module is rechargeable if it is coupled to the power supply 80 and therefore the operator does not have to replace the battery module. Alternatively, the power supply 80 is coupled to at least one of the signal conditioning module 50, the analyzer 30, and the transmitter 40 directly provides the necessary power without the battery module.

Figure 9:
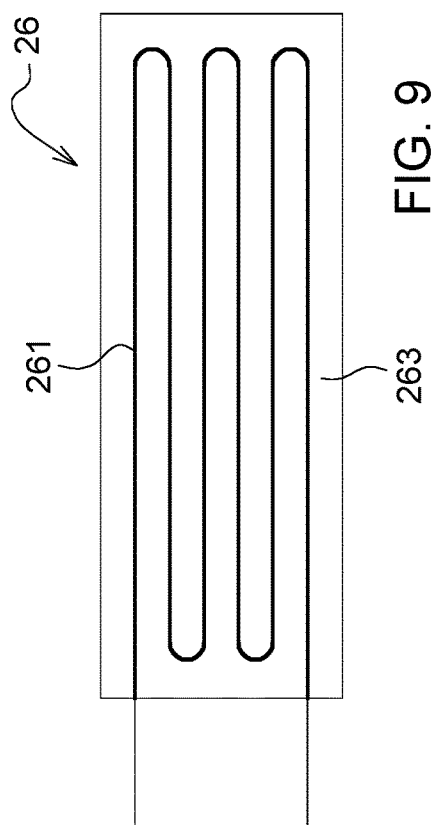
FIG. 9 is a top view of a strain sensor having a grid pattern.

The type of the strain sensors 26, as described above, may be various. In the embodiment of FIGS. 1, 2, 3A, and 4, the strain sensors 26 are resistance strain sensors, but they can be other types of strain sensors. FIG. 9 demonstrates a simple structure of a strain sensor 26. The strain sensor 26 has a grid pattern 261 and a carrier 263 which carries the grid pattern 261 (e.g. bonded foil). The two leads at the ends of the grid pattern 261 may be electrically connected with multiple resistances and an excitation voltage to form a quarter-bridge strain sensor circuit (not shown). Via the principle of Wheatstone Bridge, the resistance of the grid pattern 261 of the strain sensor 26 is determined. The resistance of the grid pattern 261 depends on the strain of the grid pattern 261. Alternatively, the circuit may include more than one strain sensors 26 and therefore have more than one grid patterns 261. For example, if there are two strain sensors 26, a half-bridge strain sensor circuit is formed. If there are four strain sensors 26, a full-bridge strain sensor circuit is formed.

In the embodiment of FIGS. 1, 2, 3A, and 4, the strain sensors 26 form a full-bridge configuration. FIG. 10 demonstrates a full-bridge strain sensor circuit which includes the strain sensors 26 and the excitation voltage $V_{EX}$ provided by the signal conditioning module 50. Since the four strain sensors 26 are positioned in different locations and different orientations on the sleeve, four grid patterns 261a-261d are respectively assigned to the strain sensors 26. The four grid patterns 261a-261d are electrically coupled to one another. In a connection between the grid patterns 261a and 261d, and in another connection between the grid pattern 261b and 261c, provide the excitation voltage $V_{EX}$ driving the current through the circuit. The first piece 2442a of the connector 2442 is electrically coupled to a connection between the grid patterns 261a and 261b, and to another connection between the grid pattern 261c and 261d; the potential voltage difference between the two connections may be used to measure the strain of the strain sensor 26.

It is noted that different orientations of the grid patterns 261a-261d may be able to reduce extraneous strains. For example, in this embodiment, due to the orientation of the grid pattern 261b, 261d are perpendicular to the grid pattern 261a, 261c, and strain caused by the temperature both directions and therefore the changes in resistances based on the temperature in the entire circuit is reduced. The circuit/network may be used to equalize some of other non-torque related strain signal.

The strain sensor(s) 26 can be various. Aside from the resistance strain sensors, the strain sensors 26 may be piezoelectric strain sensors, piezoresistive strain sensors, nanoparticle strain sensors, etc. Some types of strain sensors, such as piezoelectric strain sensors, are self-powering and therefore no excitation voltage/battery may be needed. Some types of strain sensor may need a power source.

It is noted that it is possible to utilize multiple torque sensor assemblies 20 applied on the driveline component 10 to measure the strain distribution on the housing of the driveline component 10 to calculate the torque. This may be beneficial for product design. In addition, the analyzer 30 may be coupled to an accelerometer to calculate a dynamic torque.

Optionally, in order to obtain a precise torque measurement, a designer or an operator may (1) apply multiple torque sensor assemblies on a driveline component; (2) utilize a full bridge strain sensor circuit/network; (3) adjust the direction/orientation of the grid pattern of the strain sensor in a direction that may sense less non-torque strain or the strain from that direction may be calibrated by another grid pattern of the same or another strain sensor, etc.

The torque sensor assemblies may also be used to detect debris going through the teeth of gear sets or through the rolling elements of bearings that can generate distinct strain signals that may be used to perform component wear analysis.

Without in any way limiting the scope, interpretation, or application of the claims appearing below, a technical effect of one or more of the example embodiments disclosed herein is to provide a torque sensor assembly that measures the torque applied on the driveline component through detecting of the strain adjacent to the torque sensor assembly via at least one strain sensor. Another technical effect of one or more of the example embodiments disclosed herein is to provide the structure of the torque sensor assembly that is easy to assemble and install into its component.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A torque sensor assembly for use with a driveline component, the torque sensor assembly comprising:
   a holder comprising a side wall that comprises a holder outer surface and a holder inner surface, the holder outer surface configured to correspond and attach to an aperture of the driveline component;
   a sleeve corresponding and attached to the holder inner surface;
   at least one strain sensor attached to one of a sleeve inner surface and a window of the sleeve and configured to sense a strain in the driveline component; and
   a capsule, wherein the capsule is at least formed by the sleeve, and the at least one strain sensor is exposed to an interior region of the capsule.

2. The torque sensor assembly of claim 1, wherein the holder comprises a flange, and the flange is positioned in the aperture of the driveline component.

3. The torque sensor assembly of claim 2, wherein the aperture of the driveline component comprises a recess in which the flange is positioned.

4. The torque sensor assembly of claim 2, wherein the holder comprises a holder end wall, the side wall interconnects the flange and the holder end wall, and the sleeve corresponds and is attached to the side wall.

5. The torque sensor assembly of claim 1, comprising a temperature sensor coupled to the holder and configured to determine a temperature of the driveline component.

6. The torque sensor assembly of claim 1, wherein the sleeve comprises the window, a side of the at least one strain sensor is attached to the window of the sleeve, and the at least one strain sensor comprises a sensor outer surface coupled to the holder inner surface.

7. The torque sensor assembly of claim 1, comprising a telematic transmitter electrically coupled to the at least one strain sensor and configured to transmit a signal indicative of the strain near the torque sensor assembly on the driveline component to an analyzer.

8. The torque sensor assembly of claim 1, comprising an analyzer coupled to the at least one strain sensor and configured to analyze a signal indicative of the strain near the torque sensor assembly on the driveline component from the at least one strain sensor and to calculate a torque corresponding to the strain.

9. The torque sensor assembly of claim 8, comprising a telematic transmitter electrically coupled to the analyzer and configured to transmit a signal indicative of the torque near the torque sensor assembly on the driveline component from the analyzer to a controller to control the driveline component.

10. The torque sensor assembly of claim 9, comprising a power-supply coupled to at least one of the analyzer and the telematic transmitter and configured to generate power during the movement of the driveline component, and to provide the power to at least one of the analyzer and the telematic transmitter.

11. The torque sensor assembly of claim 9, comprising a signal conditioning module connected to the at least one sensor and the analyzer and configured to condition the signal indicative of the strain near the torque sensor assembly on the driveline component from the at least one sensor before the signal indicative of the strain is received by the analyzer.

12. A torque sensor assembly for use with a driveline component, the torque sensor assembly comprising:
   a holder comprising a side wall that comprises a holder outer surface and a holder inner surface, the holder outer surface configured to correspond and attach to an aperture of the driveline component;
   a sleeve corresponding and attached to the holder inner surface;
   at least one strain sensor attached to one of a sleeve inner surface and a window of the sleeve and configured to sense a strain in the driveline component; and
   a capsule and a temperature sensor, wherein the holder comprises a holder end wall, the sleeve is included in the capsule, the capsule comprises a capsule end wall attached to the holder end wall, and the temperature sensor is positioned through the holder end wall and the capsule end wall so as to be exposed to an interior region of the driveline component.

13. A torque sensor assembly for use with a driveline component, the torque sensor assembly comprising:
   a holder comprising a side wall that comprises a holder outer surface and a holder inner surface, the holder outer surface configured to correspond and attach to an aperture of the driveline component;

a sleeve corresponding and attached to the holder inner surface;

at least one strain sensor attached to one of a sleeve inner surface and a window of the sleeve and configured to sense a strain in the driveline component;

a cap coupled to at least one of the sleeve and the holder; and a capsule end wall, wherein the cap, the sleeve, and the capsule end wall form a capsule, the sleeve interconnects the cap and the capsule end wall, and the strain sensor is exposed to an interior region of the capsule.

14. The torque sensor assembly of claim 13, comprising a potting material positioned in the interior region.

15. The torque sensor assembly of claim 13, comprising a temperature sensor partially positioned in the interior region of the capsule and partially positioned in an interior region of the driveline component.

16. The torque sensor assembly of claim 13, wherein the cap comprises a lid and a connector extending through the lid and configured to be coupled to an analyzer, and the connector comprises a first piece and a second piece coupled to the first piece such that the lid is positioned therebetween, and the at least one strain sensor is electrically coupled to the connector.

17. A torque sensor assembly for use with a driveline component, the torque sensor assembly comprising:

a holder comprising a side wall that comprises a holder outer surface and a holder inner surface, the holder outer surface configured to correspond and attach to an aperture of the driveline component;

a sleeve corresponding and attached to the holder inner surface; and at least one strain sensor attached to one of a sleeve inner surface and a window of the sleeve and configured to sense a strain in the driveline component;

wherein the at least one strain sensor comprises a plurality of strain sensors;

wherein the sleeve is a printed circuit board electrically coupled to the plurality of strain sensors via traces.

18. The torque sensor assembly of claim 17, wherein the plurality of the strain sensors are positioned evenly on a sleeve inner surface of the sleeve and coupled to one of a telematic transmitter or a connector.

19. The torque sensor assembly of claim 17, wherein the plurality of strain sensors form a full bridge network.

* * * * *